(12) United States Patent
Barnes-Leon et al.

(10) Patent No.: US 7,711,680 B2
(45) Date of Patent: *May 4, 2010

(54) COMMON COMMON OBJECT

(75) Inventors: Maria Theresa Barnes-Leon, Fremont, CA (US); Nardo B. Catahan, Jr., S. San Francisco, CA (US); Richard Mark Exley, San Carlos, CA (US)

(73) Assignee: Siebel Systems, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/809,943

(22) Filed: Mar. 24, 2004

(65) Prior Publication Data

US 2004/0249854 A1    Dec. 9, 2004

Related U.S. Application Data

(60) Provisional application No. 60/457,493, filed on Mar. 24, 2003.

(51) Int. Cl.
*G06F 17/30* (2006.01)

(52) U.S. Cl. .......................... 707/10; 707/101; 709/221

(58) Field of Classification Search ............... 707/2, 707/10, 102, 205, 201, 101; 709/225, 221
See application file for complete search history.

(56) References Cited

U.S. PATENT DOCUMENTS

| | | | | |
|---|---|---|---|---|
| 4,714,995 A | | 12/1987 | Materna et al. ............. 364/200 |
| 5,311,438 A | | 5/1994 | Sellers et al. ................. 700/96 |
| 5,349,643 A | | 9/1994 | Cox et al. ..................... 380/25 |
| 5,416,917 A | * | 5/1995 | Adair et al. ................. 707/203 |
| 5,446,880 A | * | 8/1995 | Balgeman et al. .............. 707/9 |
| 5,566,332 A | * | 10/1996 | Adair et al. ................. 707/101 |
| 5,646,862 A | | 7/1997 | Jolliffe et al. .................. 703/1 |
| 5,708,828 A | | 1/1998 | Coleman .................... 395/785 |
| 5,727,158 A | * | 3/1998 | Bouziane et al. ............. 709/225 |
| 5,742,588 A | | 4/1998 | Thornberg et al. .......... 370/236 |
| 5,758,355 A | | 5/1998 | Buchanan .................... 707/201 |
| 5,970,490 A | | 10/1999 | Morgenstern ................. 707/10 |
| 6,178,418 B1 | | 1/2001 | Singer ........................... 707/3 |
| 6,216,130 B1 | * | 4/2001 | Hougaard et al. .............. 707/10 |

(Continued)

FOREIGN PATENT DOCUMENTS

DE    101 50 391 A1    5/2002

(Continued)

OTHER PUBLICATIONS

Anil K. Nori et al., "Bringing Objects to the Mainstream," Compcon Proceedings, IEEE San Jose, California, Feb. 23-26, 1997, pp. 136-142.

(Continued)

*Primary Examiner*—Jean M Corrielus
(74) *Attorney, Agent, or Firm*—Campbell Stephenson LLP

(57) ABSTRACT

Enterprise management information in a first format for use by a first computerized system is transformed into an intermediate format to readily make the stored enterprise management information available for use in a second computerized system that utilizes a second format. The transformation includes a plurality of common data type elements that are adapted to be shared across a plurality of data objects in the intermediate format.

42 Claims, 15 Drawing Sheets

U.S. PATENT DOCUMENTS

| | | | | |
|---|---|---|---|---|
| 6,226,649 | B1 * | 5/2001 | Bodamer et al. | 707/104.1 |
| 6,236,997 | B1 * | 5/2001 | Bodamer et al. | 707/10 |
| 6,275,812 | B1 | 8/2001 | Haq et al. | 705/11 |
| 6,336,124 | B1 | 1/2002 | Alam et al. | 715/523 |
| 6,343,275 | B1 | 1/2002 | Wong | 705/26 |
| 6,377,952 | B1 * | 4/2002 | Inohara et al. | 707/101 |
| 6,385,620 | B1 | 5/2002 | Kurzius et al. | 707/104.1 |
| 6,434,567 | B1 | 8/2002 | De La Huerga | 707/102 |
| 6,463,430 | B1 | 10/2002 | Brady et al. | 707/3 |
| 6,556,950 | B1 * | 4/2003 | Schwenke et al. | 702/183 |
| 6,591,260 | B1 | 7/2003 | Schwarzhoff et al. | 702/2 |
| 6,631,382 | B1 | 10/2003 | Kouchi et al. | 707/102 |
| 6,668,253 | B1 | 12/2003 | Thompson et al. | 707/10 |
| 6,754,679 | B2 * | 6/2004 | Oheda | 707/201 |
| 6,778,651 | B1 * | 8/2004 | Jost et al. | 379/201.01 |
| 6,792,431 | B2 | 9/2004 | Tamboli et al. | 707/102 |
| 6,826,542 | B1 | 11/2004 | Virgin et al. | 705/34 |
| 6,828,963 | B1 | 12/2004 | Rappoport | 345/419 |
| 6,883,004 | B2 | 4/2005 | Bahl et al. | 707/10 |
| 6,889,260 | B1 * | 5/2005 | Hughes | 709/246 |
| 6,912,719 | B2 | 6/2005 | Elderon et al. | 719/319 |
| 6,947,947 | B2 * | 9/2005 | Block et al. | 707/102 |
| 7,043,687 | B2 | 5/2006 | Knauss et al. | 715/513 |
| 7,099,350 | B2 | 8/2006 | Peterson | 370/465 |
| 7,111,077 | B1 | 9/2006 | Starkovich et al. | 709/246 |
| 7,124,112 | B1 * | 10/2006 | Guyan et al. | 705/44 |
| 7,257,594 | B2 | 8/2007 | Tamboli et al. | 701/101 |
| 7,287,041 | B2 | 10/2007 | Barnes-Leon et al. | 707/104.1 |
| 2002/0019765 | A1 | 2/2002 | Mann et al. | 705/11 |
| 2002/0035431 | A1 | 3/2002 | Ell | 702/5 |
| 2002/0040313 | A1 | 4/2002 | Hunter et al. | 705/9 |
| 2002/0085020 | A1 | 7/2002 | Carroll, Jr. | 345/700 |
| 2002/0116234 | A1 | 8/2002 | Nagasawa | 705/5 |
| 2002/0123983 | A1 | 9/2002 | Riley et al. | 707/1 |
| 2002/0138582 | A1 | 9/2002 | Chandra et al. | 709/206 |
| 2002/0169867 | A1 | 11/2002 | Mann et al. | 709/224 |
| 2002/0174417 | A1 | 11/2002 | Sijacic et al. | 717/147 |
| 2002/0178077 | A1 | 11/2002 | Katz et al. | 705/26 |
| 2002/0184085 | A1 | 12/2002 | Lindia et al. | 705/11 |
| 2002/0184148 | A1 | 12/2002 | Kahn et al. | 705/40 |
| 2002/0188513 | A1 | 12/2002 | Gil et al. | 705/22 |
| 2002/0188538 | A1 | 12/2002 | Robertson et al. | 705/35 |
| 2003/0023580 | A1 * | 1/2003 | Braud et al. | 707/3 |
| 2003/0071852 | A1 | 4/2003 | Stimac | 345/810 |
| 2003/0097642 | A1 | 5/2003 | Arai et al. | 716/1 |
| 2003/0131018 | A1 | 7/2003 | Godoy et al. | 707/104.1 |
| 2003/0163597 | A1 | 8/2003 | Hellman et al. | 709/316 |
| 2003/0229529 | A1 | 12/2003 | Mui et al. | 705/8 |
| 2004/0015515 | A1 | 1/2004 | Beisiegel et al. | 707/103 Y |
| 2004/0039576 | A1 | 2/2004 | He et al. | 705/1 |
| 2004/0128188 | A1 | 7/2004 | Leither et al. | 705/11 |
| 2004/0199536 | A1 | 10/2004 | Barnes-Leon et al. | 705/26 |
| 2004/0215503 | A1 | 10/2004 | Allpress et al. | 705/11 |
| 2004/0249854 | A1 | 12/2004 | Barnes-Leon et al. | 703/103 Y |
| 2005/0021391 | A1 | 1/2005 | Lu et al. | 705/11 |
| 2005/0091249 | A1 | 4/2005 | Hanson et al. | 707/101 |
| 2005/0197880 | A1 | 9/2005 | Walsh et al. | 705/8 |
| 2006/0271446 | A1 | 11/2006 | Barnes-Leon et al. | 705/26 |
| 2007/0033531 | A1 | 2/2007 | Marsh | 715/738 |
| 2007/0203710 | A1 | 8/2007 | Habichler et al. | 705/1 |
| 2007/0208577 | A1 | 9/2007 | Barnes-Leon et al. | 705/1 |
| 2007/0208878 | A1 | 9/2007 | Barnes-Leon et al. | 709/246 |
| 2007/0214063 | A1 | 9/2007 | Kahlon et al. | 705/28 |
| 2007/0214064 | A1 | 9/2007 | Kahlon et al. | 705/28 |
| 2007/0214065 | A1 | 9/2007 | Kahlon et al. | 705/28 |
| 2007/0226049 | A1 | 9/2007 | Muralitharan et al. | 705/11 |
| 2007/0250419 | A1 | 10/2007 | Kumar et al. | 705/34 |
| 2007/0265944 | A1 | 11/2007 | Catahan, Jr. et al. | 705/30 |

FOREIGN PATENT DOCUMENTS

| | | |
|---|---|---|
| JP | 2001 256308 | 9/2001 |
| WO | WO 01/88759 A1 | 11/2001 |
| WO | WO 03/003641 | 1/2003 |

OTHER PUBLICATIONS

"Cross Access Introduces SERIESfour; Offers Native, Fast, Scalable Legacy Data Connectivity for Data Marts, ERP Applications," PR Newswire; New York; Jan. 18, 1999; pp. 1-3. Downloaded from http://proquest.umit.com.

Hardwick, Martin, David L. Spooner, Rom Rando, and K.C. Morris, "Sharing Manufacturing Information in Virtual Enterprises;" Communication of the ACM; vol. 39, No. 2; Feb. 1996; pp. 46-54. Downloaded from http://delivery.acm.org.

Kappelhoff, Ralph, "Integration of ERP to the Final Control Elements;" ISA Transactions; 1998; vol. 36, No. 4; pp. 229-238. Downloaded from http://www.sciencedirect.com.

PTC: Siebel Systems and PTC create strategic alliance to leverage entriched information across product development, sales and service; Combination of Siebel eBusiness Applications and PTC Collaborative Product Development solutions to deliver competitive advantage, M2 Presswire, Conventry: Jan. 24, 2002, 3 pages (retrieved from ProQuest.com).

Wilson, J.R., "Aerospace Looks for Lift from e-commerce," Intervia, Geneva, Jul./Aug. 2001; vol. 56, Issue 655, 6 pages (retrieved from ProQuest.com).

XML/EDI Group. "Guidelines for using XML for Electronic Data Interchange." Presented at XML One-San Jose, Sep./Oct. 2001. Downloaded from http://web.archive.org/web/20040413182700/http://www.xmledi-group.org/.

NPL_XML_Schema_CE.pdf, A tutorial published by the SML governing body of w3.org regarding the use of SML Schemas and Complex Data Elements. Downloaded on Jun. 10, 2009 from http://www.w3schools.com/Schema/schema_intro.asp? and http://www.w3schools.com/Schema/schema_complex.asp? and http://www.w3schools.com/Schema/schema_complex_empty.asp?;7 pages.

* cited by examiner

COMMON COMMON OBJECT

CROSS REFERENCE TO RELATED APPLICATIONS

This application claims the benefit of U.S. Provisional Patent Application No. 60/457,493 filed Mar. 24, 2003, entitled, "COMMON COMMON OBJECT," by Barnes-Leon et al., and which is hereby incorporated by reference in its entirety.

TECHNICAL FIELD

The present invention is directed to the field of data modeling, and more specifically to aspects of reusable data types that can be referenced by other data objects.

BACKGROUND

An enterprise may employ various systems to manage various aspects of human resources and enterprise resources. The various systems can include Human Resource Management (HRM) systems, Employee Relationship Management (ERM) systems, Enterprise Resources Planning (ERP) systems, supply chain management (SCM) and warehouse management (WMS), and custom applications for the purpose of sharing data. Such an enterprise system is herein referred to as a multi-application integration system (MAIS). The various systems in the MAIS need to communicate data to each other. However, the users of enterprise data in the back-office typically store data in forms usable by the back-office computerized system, which often differ significantly from the forms usable with front-office computerized systems.

Thus, when some or all aspects of enterprise data are managed by both back-office and front-office computerized systems, there is a need to synchronize the enterprise data in both computerized systems.

Thus, in order for front-office computerized systems to communicate with back-office computerized systems that are already being used, the user must manually regenerate data from the back-office computerized systems in forms usable by the front-office computerized systems. Such manual regeneration has several significant disadvantages, including: (1) it is often expensive; (2) it often requires a substantial amount of time to complete; (3) it must be repeated each time data changes in either the back-office system or the front-office system; and (4) it is prone to errors.

In view of the foregoing, an automated and efficient approach for transforming data used by a back-office computerized system for use by a front-office computerized system, or vice versa, is needed.

DETAILED DESCRIPTION

Figure 1A:
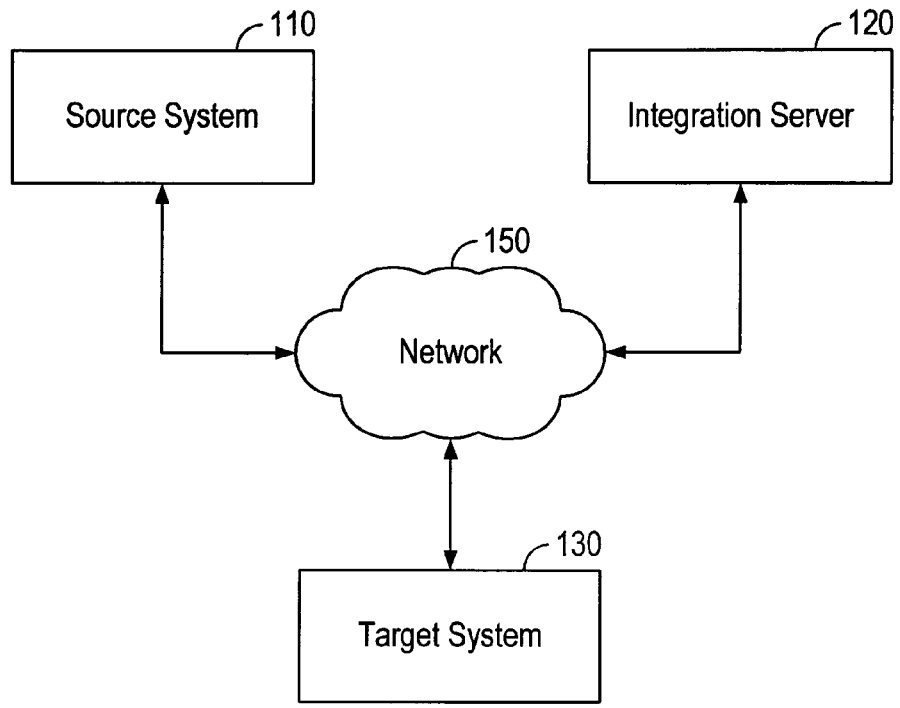
FIG. 1A is a high-level network diagram showing aspects of a computerized environment in which the facility operates, according to certain embodiments.

All changes in the enterprise information need to be captured and made accessible to all relevant computer applications that the enterprise uses to manage various aspects of enterprise resources. Thus, a common data storage model is needed for enabling users of the relevant computer applications to have the same view of the enterprise information across the various computer applications.

According to certain embodiments, the common data storage model utilizes common objects that provide defined data structures that can be used as conduits for passing enterprise information from one computerized system to another in the enterprise multi-application integration system (MAIS). Such a data structure is a common structure that can be mapped to multiple distinct enterprise systems purchased from different vendors. Such a common data storage model is herein referred to as a common object data model or an MAIS data model.

One aspect of the common object data model is the design and utilization of "Common" common objects. In other words, the "Common" common objects provide data types that can be shared by a multiplicity of common objects that are in the common object data model.

The data types associated with Common common objects are defined in a Common common object schema, herein referred to as "common.xsd". All integration application processes in MAIS have the common.xsd available for use within such integration application processes.

The common.xsd provides reusable data types that can be referenced by any common object within the common object data model. Instead of defining redundant data types that are local to each common object, the common.xsd provides global data types that can be used by all common objects, thus reducing the complexity of the data model, and allowing for simpler changes of data types in the future (if needed). The alternative is to define all elements within each common object, but to do so would increase maintenance costs and decrease standardization.

The common.xsd is not meant to be the data transport schema by itself. It is a library (repository) of commonly used data types. The data types within common.xsd provide standard definitions of data elements that can be reused by other common objects.

Some of the data types defined in the common.xsd are:
  Address data types
  Communication data types (phone numbers, email, etc.)

Cross-reference data types (value cross reference, ID cross reference, etc.)
Message data types (error messages, informational messages)
Credit Card or payment card data types
Alternate ID data types
Fault Handling data types
Activity data types
Data Cleansing data types
Application data types For example, common objects in the common object data model that require address information simply refer to the address data type defined in common.xsd, rather than recreating an entire address format within each of the common objects that need address information. Thus, there may be many common objects referring to the same address data type defined in common.xsd. If it is later determined that the addition of more elements within the address data type would be beneficial, the data type would be modified in common.xsd, and all of the common objects that refer to the address data type will inherit the new definition of an address. On the other hand, if the address format were defined in every common object that needs address information, then any changes to the address format would require that all such common objects be updated manually. The common.xsd, as used within MAIS, significantly reduces maintenance efforts and increases standardization of the data model.

Thus, the design of the Common common object is suitably adapted to evolve for enhancing the utility of the common object data model. Each reusable data type has a clearly defined native data type (e.g. string, date, integer, float, double, etc.) that corresponds to XML standards.

When enterprise information is passed from the back-office enterprise system to the front-office enterprise system, then the back-office enterprise system is referred to as the source system and the front-office enterprise system is referred to as the target system. On the other hand, when enterprise information is passed from the front-office enterprise system to the back-office enterprise system, then the front-office enterprise system is referred to as the source system and the back-office enterprise system is referred to as the target system.

A software facility (hereafter "the facility") for automatically converting enterprise information, is described. In some embodiments, the facility converts enterprise information from a form used by the source system to a form used by the target system.

In some embodiments, such as embodiments adapted for converting enterprise information in the first source format, the facility converts enterprise information by converting the enterprise information that is in the first source format into an intermediate format. The intermediate format includes a plurality of common data type elements that are adapted to be shared across a plurality of data objects in the intermediate format. The intermediate format is then used to convert the enterprise information into the target format.

By performing such conversions, embodiments of the facility enable a user of a first computerized system who has stored enterprise information in a first format for use by the first computerized system to readily make the stored enterprise information available for use in a second computerized system that utilizes a second format in a cost-efficient and time-efficient manner.

FIG. 1A is a high-level network diagram showing aspects of a typical hardware environment in which the facility operates. FIG. 1A shows a source system 110, a target system 130, an integration server 120 and a network 150. Source system 110 stores enterprise information in a source format. There may be more than one source system. Target system 130 stores enterprise information in a target format. There may be more than one target system.

The facility (not shown) converts some or all the enterprise information that is in the source format into the target format by using an intermediate format of the enterprise information. In certain embodiments, such conversions are performed with the aid of one or more other computer systems, such as integration server system 120. Components of the facility may reside on and/or execute on any combination of these computer systems, and intermediate results from the conversion may similarly reside on any combination of these computer systems.

The computer systems shown in FIG. 1A are connected via network 150, which may use a variety of different networking technologies, including wired, guided or line-of-sight optical, and radio frequency networking. In some embodiments, the network includes the public switched telephone network. Network connections established via the network may be fully-persistent, session-based, or intermittent, such as packet-based. While the facility typically operates in an environment such as is shown in FIG. 1A and described above, those skilled in the art will appreciate the facility may also operate in a wide variety of other environments.

Figure 1B:
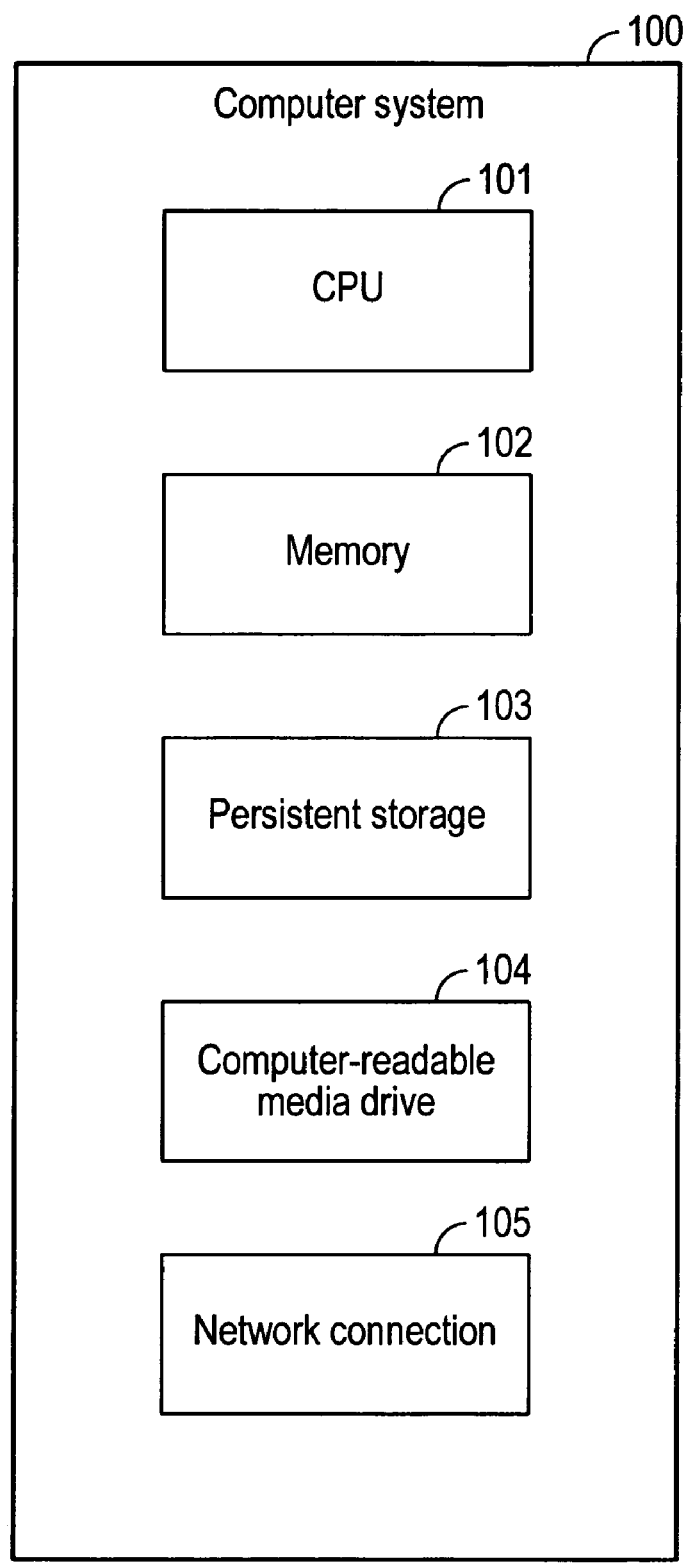
FIG. 1B is a block diagram showing some of the components typically incorporated in at least some of the computer systems and other devices on which the facility executes.

FIG. 1B is a block diagram showing some of the components typically incorporated in at least some of the computer systems and other devices on which the facility executes, including some or all of the server and client computer systems shown in FIG. 1A. These computer systems and devices 100 may include one or more central processing units ("CPUs") 101 for executing computer programs; a computer memory 102 for storing programs and data—including data structures—while they are being used; a persistent storage device 103, such as a hard drive, for persistently storing programs and data; a computer-readable media drive 104, such as a CD-ROM drive, for reading programs and data stored on a computer-readable medium; and a network connection 105 for connecting the computer system to other computer systems, such as via the Internet, to exchange programs and/or data—including data structures. While computer systems configured as described above are typically used to support the operation of the facility, those skilled in the art will appreciate that the facility may be implemented using devices of various types and configurations, and having various components.

It will be understood by those skilled in the art that the facility may transform enterprise information from a number of different source systems and from a number of different source software packages to a number of target systems and/or to a number of target software packages.

The intermediate data structures used by the facility include common common data structures. Common common data structures are reusable data types that can be referenced by other intermediate data structures. Common common data structures include one or more elements comprising: an application element, a fault handler input element, a fault handler output element, a fault transformer input element, a fault transformer output element, a list of application instance element, a list of application type element, a list of ID cross-reference element, a list of ID cross-reference data element, a list of message definition element, a list of message text element, a list of value cross-reference element, and a list of value cross-reference data element, a message element, a message set element, an activity type element, an address type element, an alternate ID type element, a communication data type element, a data cleansing data type element, and a payment card type element.

Figure 2:
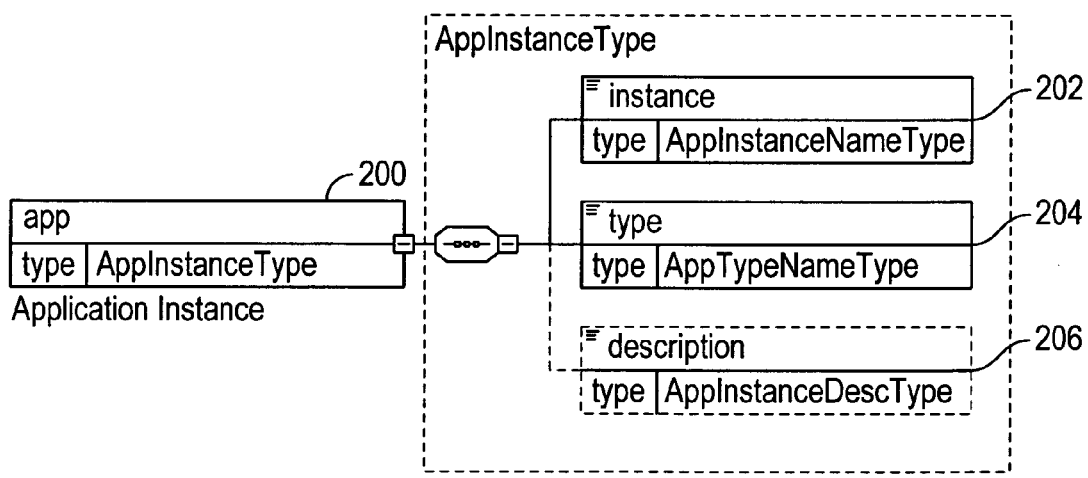
FIG. 2 shows the application instance structure 200.

FIG. 2 shows that the application instance structure 200 may include one or more of: an application instance name element 202, an application type name element 204, and an application instance description element 206.

Figure 3:
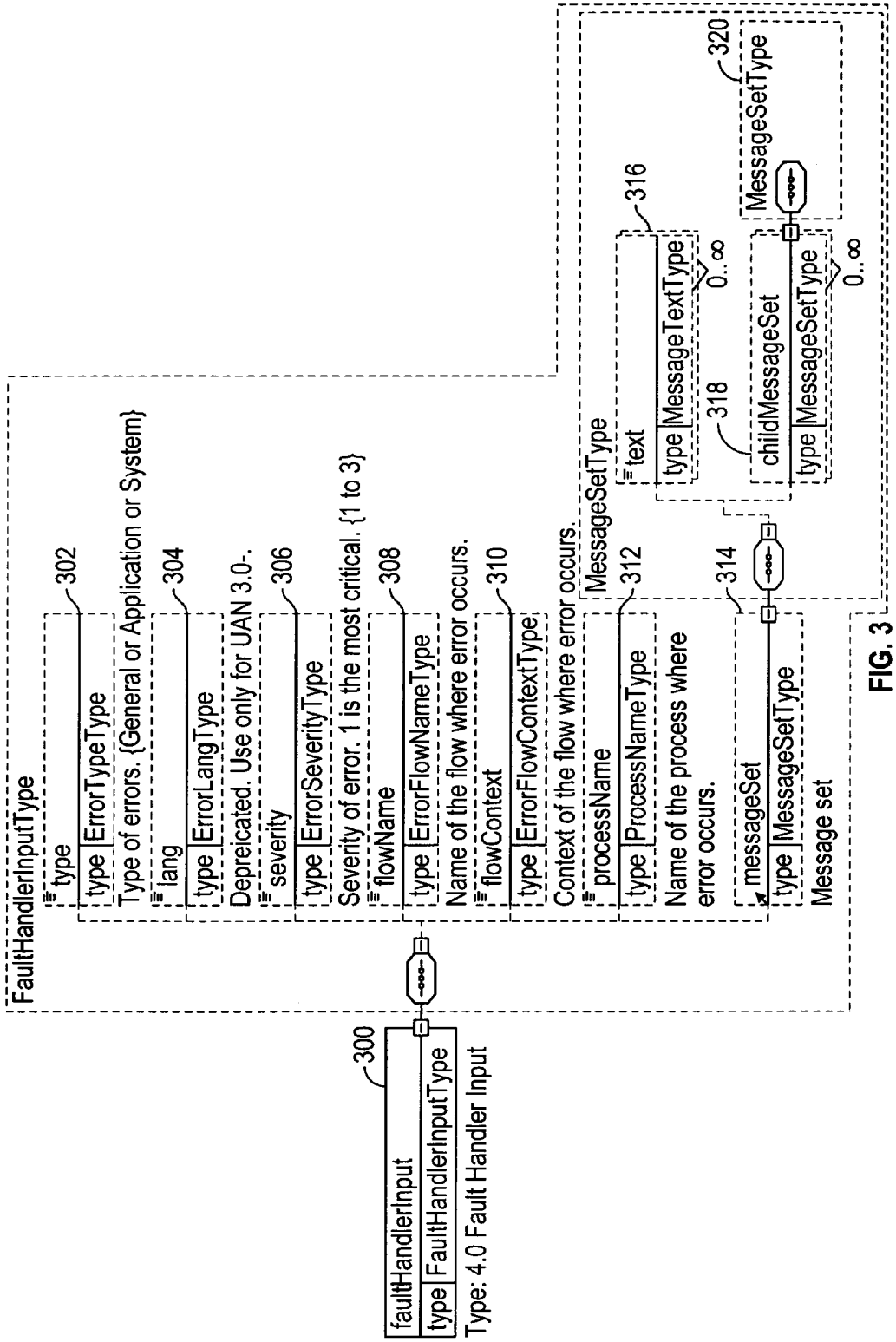
FIG. 3 shows the fault handler input structure 300.

FIG. 3 shows that the fault handler input structure 300 may include one or more of: an error type element 302, an error language element 304, an error severity element 306, an error flow name element 308, an error flow context element 310, a process name element 312, a message set element 314, a plurality of message text sub-elements 316, and a plurality of child message set sub-elements 318. Each child message set sub-element can include other message set sub-elements 320.

Figure 4:
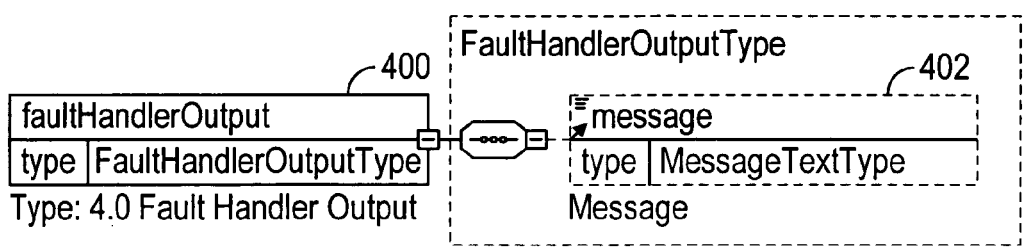
FIG. 4 shows the fault handler output structure 400.

FIG. 4 shows that the fault handler output structure 400 may include a message text element 402.

Figure 5:
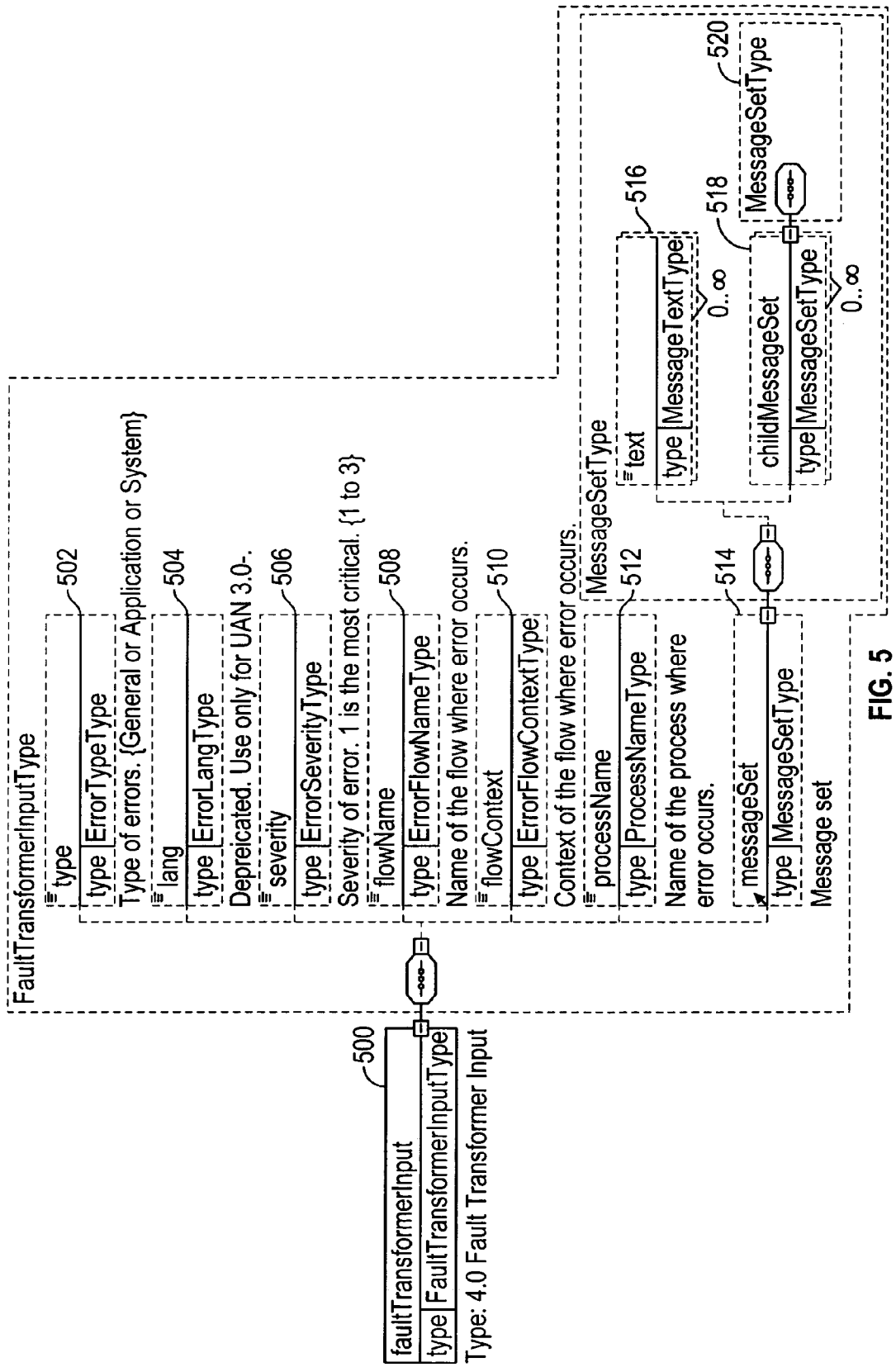
FIG. 5 shows the fault transformer input structure 500.

FIG. 5 shows that the fault transformer input structure 500 may include one or more of: an error type element 502, an error language element 504, an error severity element 506, an error flow name element 508, an error flow context element 510, a process name element 512, a message set element 514, a plurality of message text sub-elements 516, and a plurality of child message set sub-elements 518. Each child message set sub-element can include other message set sub-elements 520.

Figure 6:
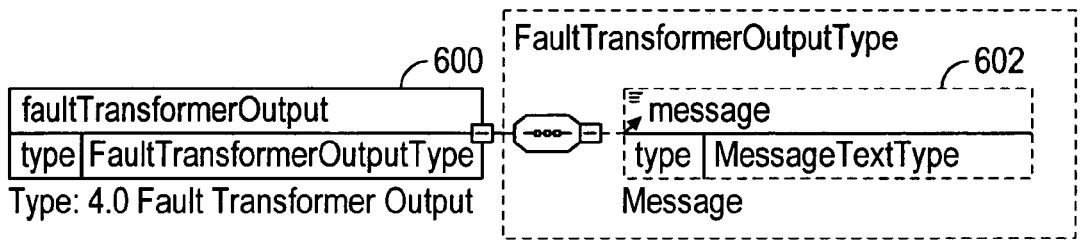
FIG. 6 shows the fault transformer output structure 600.

FIG. 6 shows that the fault transformer output structure 600 may include a message text element 602.

Figure 7:
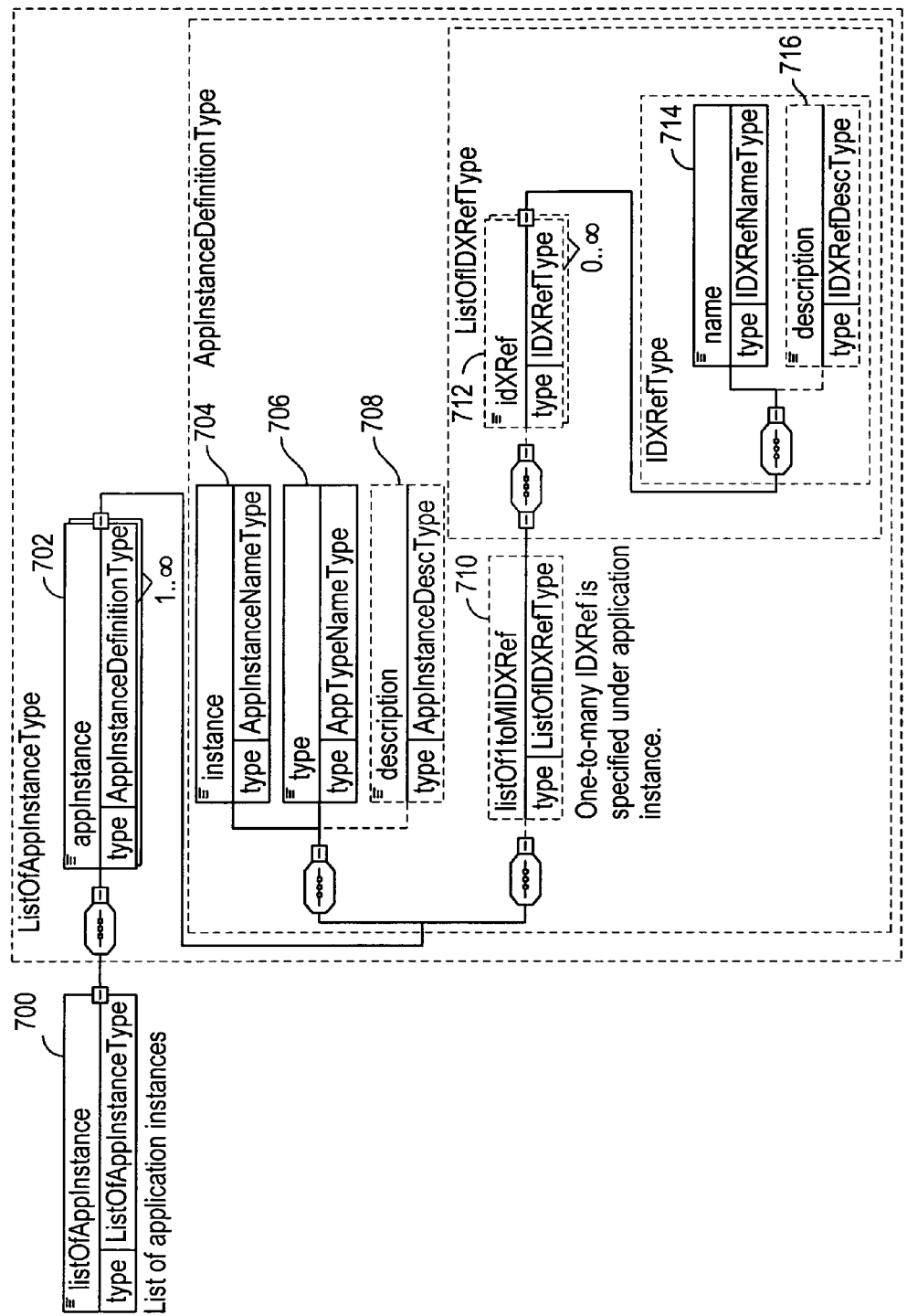
FIG. 7 shows the list of application instance structure 700.

FIG. 7 shows that the list of application instance structure 700 may include one or more of: a plurality of application instance definition elements 702, an application instance name sub-element 704, an application type name sub-element 706, an application instance description sub-element 708, a list of one-to-many ID cross-reference sub-element 710, a plurality of ID cross-reference sub-elements 712, an ID cross-reference name sub-element 714, and an ID cross-reference description sub-element 716.

Figure 8:
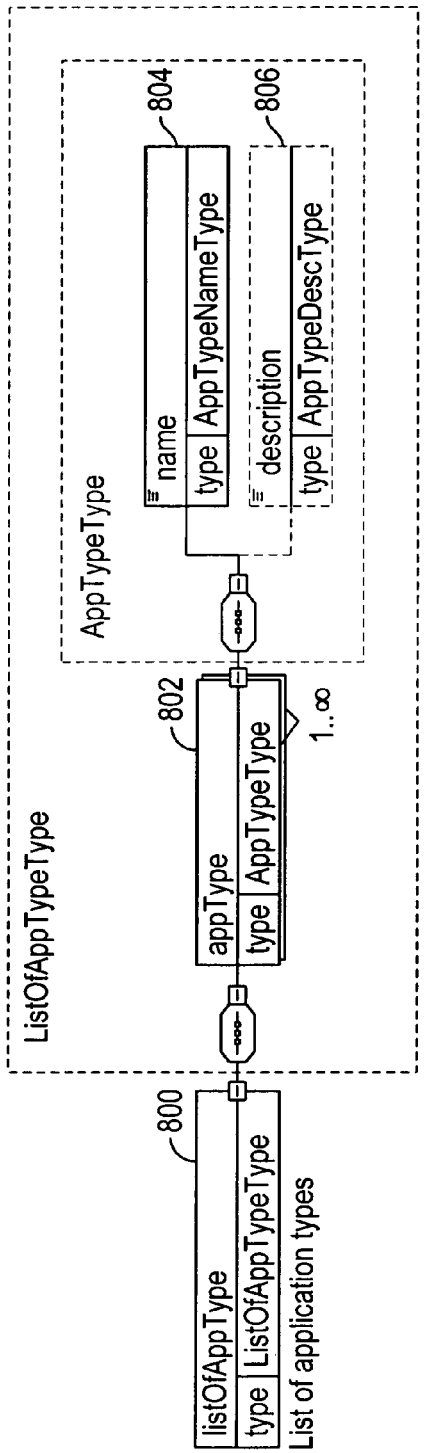
FIG. 8 shows the list of application type structure 800.

FIG. 8 shows that the list of application type structure 800 may include one or more of: a plurality of application type elements 802, an application type name sub-element 804, and an application type description sub-element 806.

Figure 9:
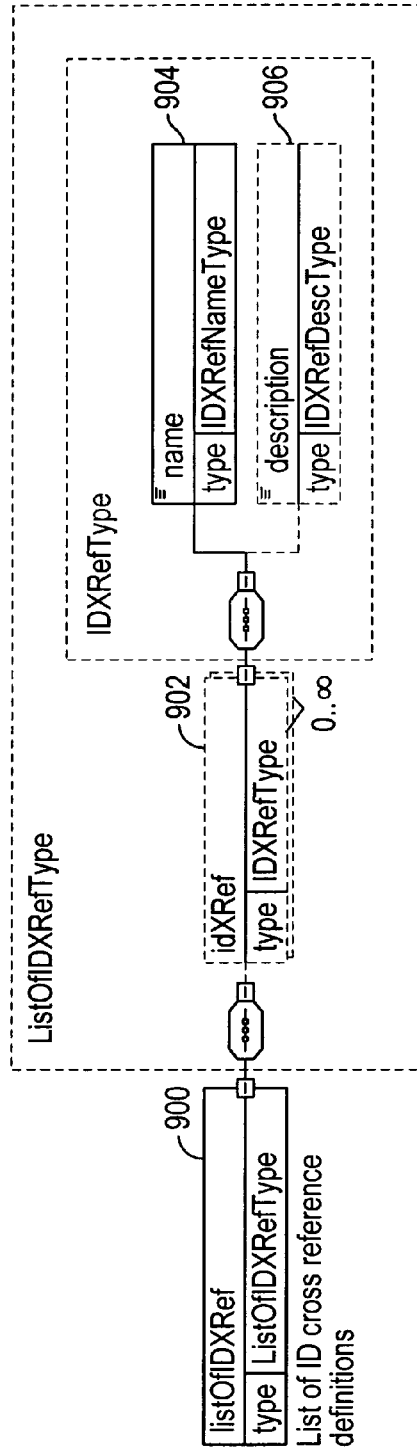
FIG. 9 shows the list of ID Cross-reference structure 900.

FIG. 9 shows that the list of ID Cross-reference structure 900 may include one or more of: a plurality of ID cross-reference elements 902, an ID cross-reference name sub-element 904, and an ID cross-reference description sub-element 906.

Figure 10:
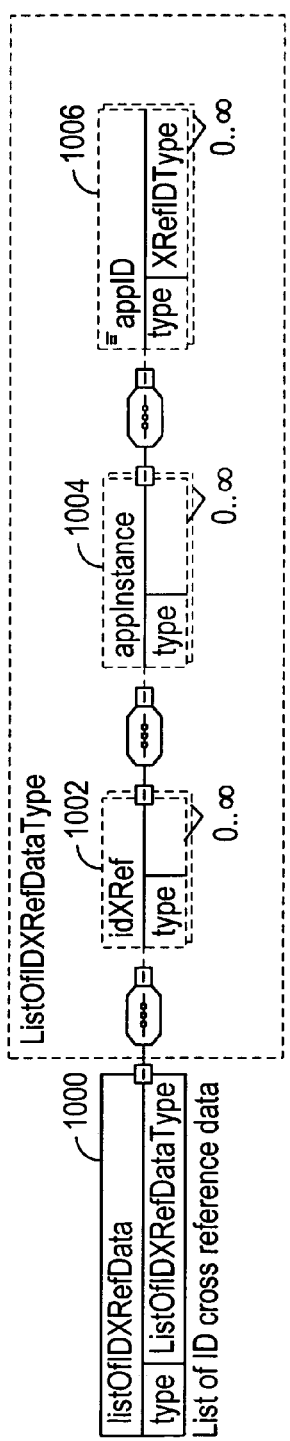
FIG. 10 shows the list of ID Cross-reference data structure 1000.

FIG. 10 shows that the list of ID Cross-reference data structure 1000 may include one or more of: a plurality of ID cross-reference elements 1002, a plurality of application instance sub-elements 1004, and a plurality of application ID sub-elements 1006.

Figure 11:
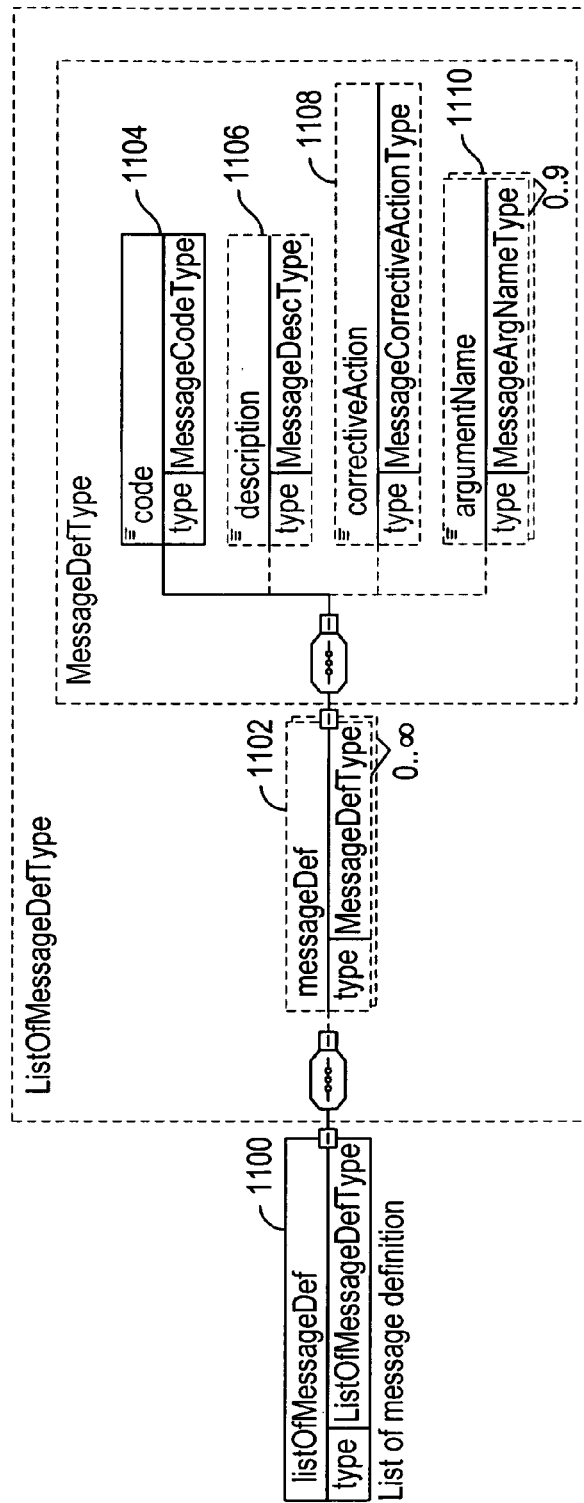
FIG. 11 shows the list of message definition structure 1100.

FIG. 11 shows that the list of message definition structure 1100 may include one or more of: a plurality of message definition elements 1102; a message code sub-element 1104, a message description sub-element 1106, a message corrective action sub-element 1108, and a message argument name sub-element 1110.

Figure 12:
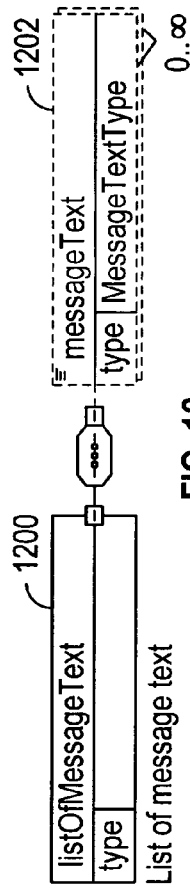
FIG. 12 shows the list of message text structure 1200.

FIG. 12 shows that the list of message text structure 1200 may include a plurality of message text elements 1202.

Figure 13:
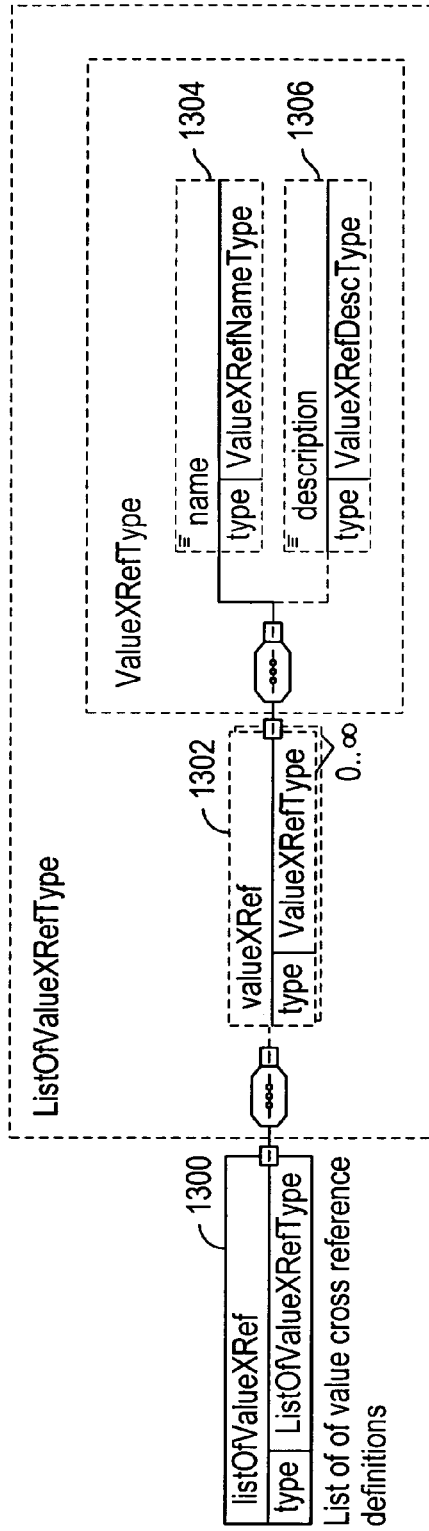
FIG. 13 shows the list of value cross-reference structure 1300.

FIG. 13 shows that the list of value cross-reference structure 1300 may include one or more of: a plurality of value cross-reference elements 1302, a value cross-reference name sub-element 1304, and a value cross-reference description sub-element 1306.

Figure 14:
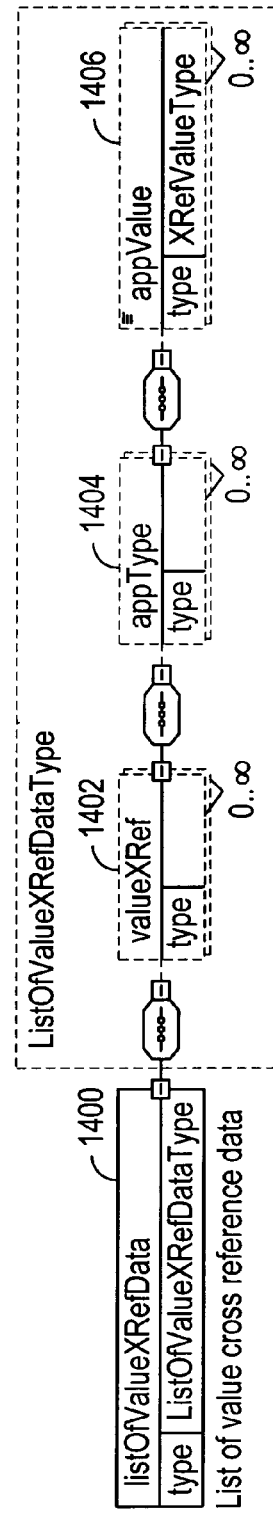
FIG. 14 shows the value cross-reference data structure 1400.

FIG. 14 shows that the value cross-reference data structure 1400 may include a plurality of value cross-reference elements 1402, a plurality of application type sub-elements 1404, and a plurality application value sub-elements 1406.

Figure 15:
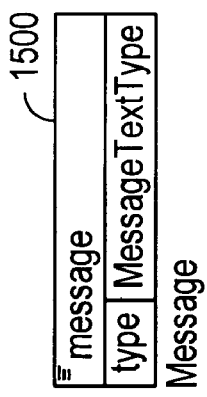
FIG. 15 shows the message text element 1500.

FIG. 15 shows the message text element 1500.

Figure 16:
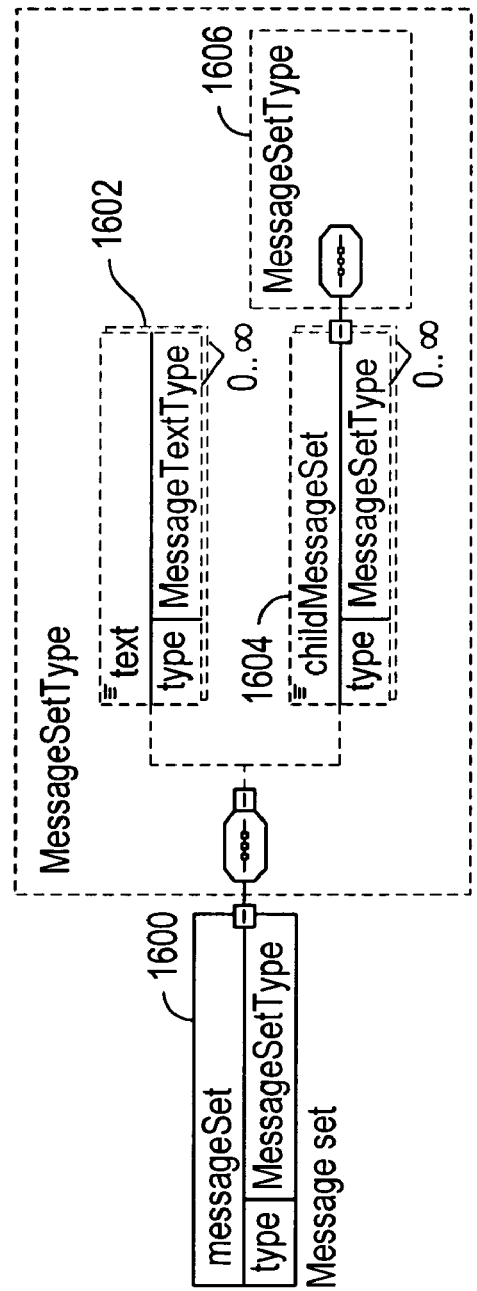
FIG. 16 shows the message set structure 1600.

FIG. 16 shows that the message set structure 1600 may include one or more of: a plurality of message text elements 1602, and a plurality of child message set elements 1604. Each child message set element can include a message set sub-element 1606.

Figure 17:
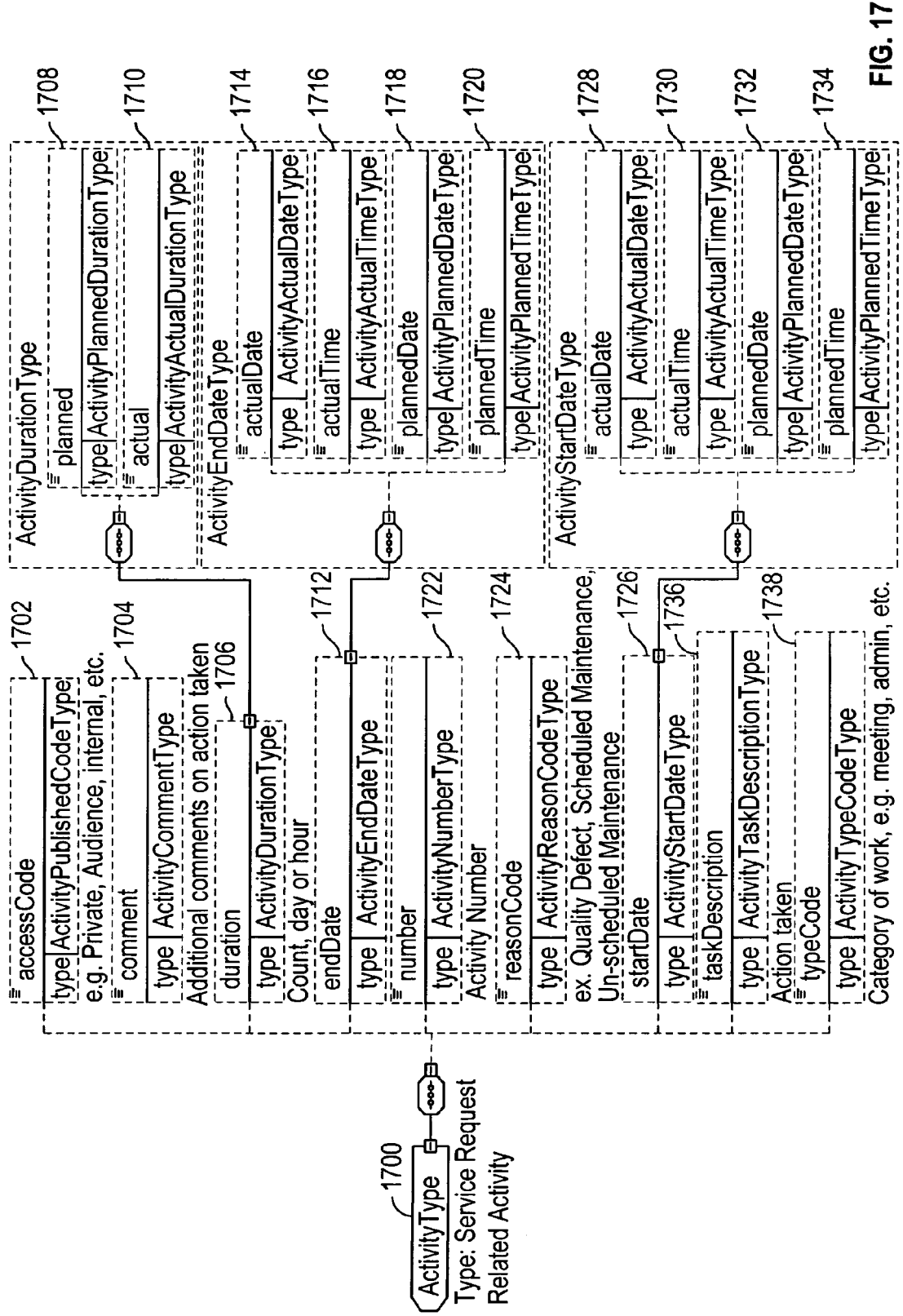
FIG. 17 shows the activity type structure 1700.

FIG. 17 shows that the activity type structure 1700 may include one or more of: an activity published code element 1702, an activity comment element 1704, an activity duration element 1706, an activity end date element 1712, an activity number element 1722, an activity reason code element 1724, an activity start date element 1726, an activity task description element 1736, an activity type code element 1738, an activity planned duration sub-element 1708, an activity actual duration sub-element 1710. End date element 1712 includes an activity actual date sub-element 1714, an activity actual time sub-element 1716, an activity planned date sub-element 1718, and an activity planned time sub-element 1720. Start date element 1726 includes an activity actual date sub-element 1728, an activity actual time sub-element 1730, an activity planned date sub-element 1732, and an activity planned time sub-element 1734.

Figure 18:
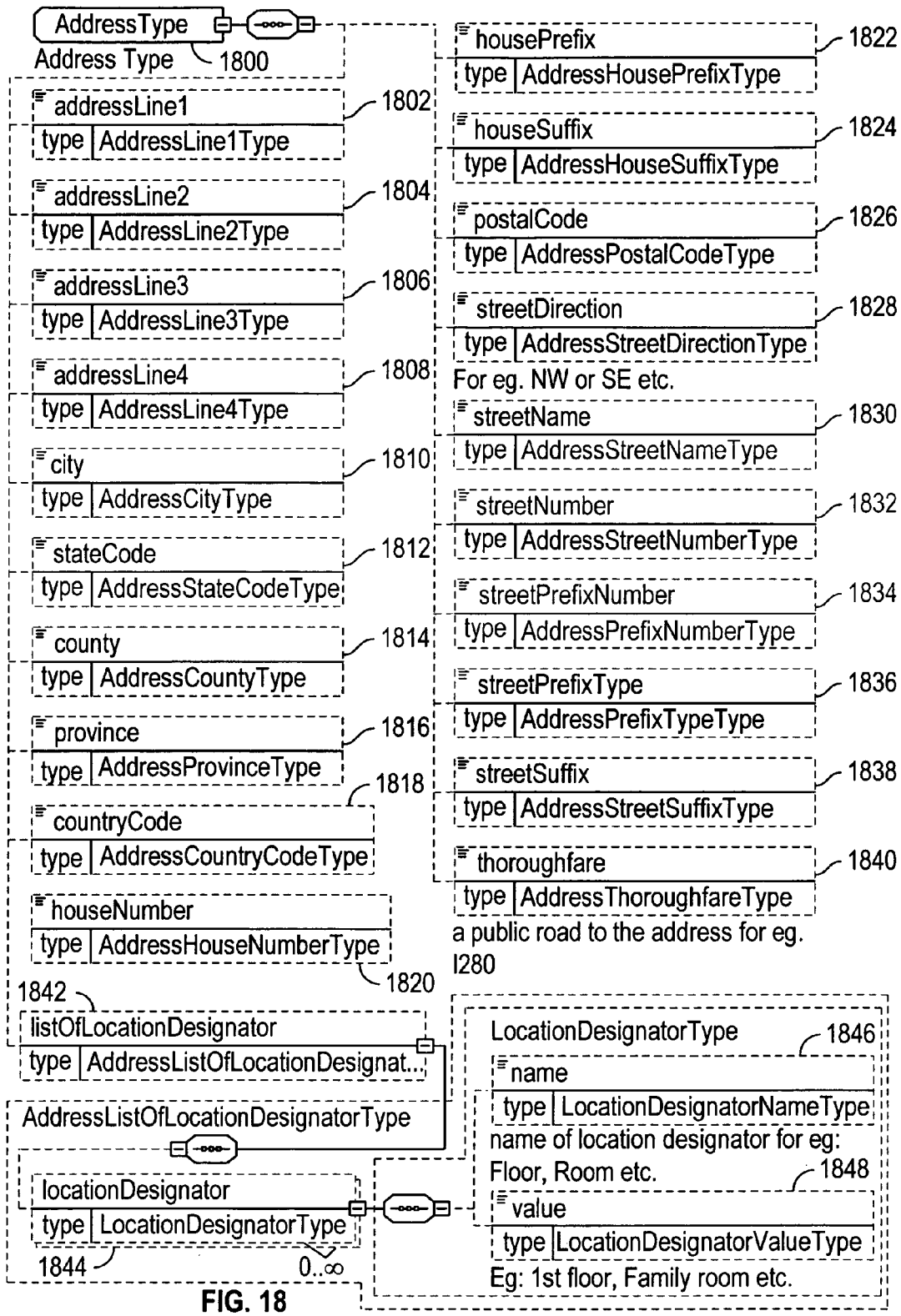
FIG. 18 shows the address type structure 1800.

FIG. 18 shows that the address type structure 1800 may include one or more of: a plurality of address line elements 1802, 1804, 1806, 1808, an address city element 1810, an address state code element 1812, an address county element 1814, an address province element 1816, an address country code element 1818, an address house number element 1820, an address house prefix element 1822, an address house suffix element 1824, an address postal code element 1826, an address street direction element 1828, an address street name element 1830, an address street number element 1832, an address street prefix number element 1834, an address street prefix type element 1836, an address street suffix element 1838, an address thoroughfare element 1840, an address list of location designator element 1842, a plurality of address location designator sub-elements 1844, an address location designator name sub-element 1846, and an address location designator value sub-element 1848.

Figure 19:
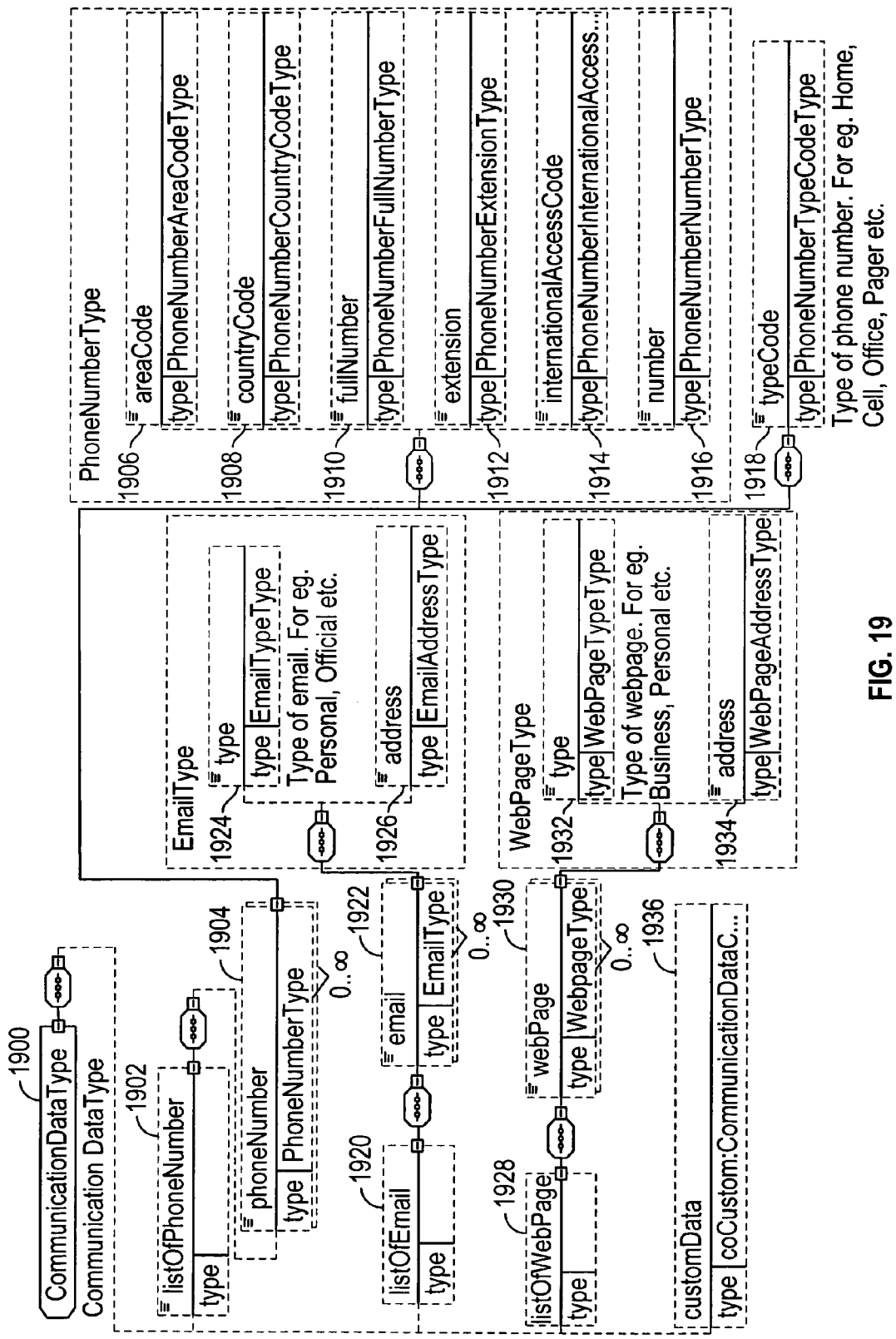
FIG. 19 shows the communication data type structure 1900.

FIG. 19 shows that the communication data type structure 1900 may include one or more of: a list of phone number element 1902, a list of email element 1920, a list of web page element 1928, a custom communication data element 1936, a phone number sub-element 1904, an email sub-element 1922, a web page sub-element 1930, a phone number area code sub-element 1906, a phone number country code sub-element 1908, a phone number full number sub-element 1910, a phone number extension sub-element 1912, a phone number international access code sub-element 1914, a phone number sub-element 1916, a phone number type code sub-element 1918, an email type sub-element 1924, an email address sub-element 1926, a web page type sub-element 1932, and a web page address sub-element 1934.

Figure 20:
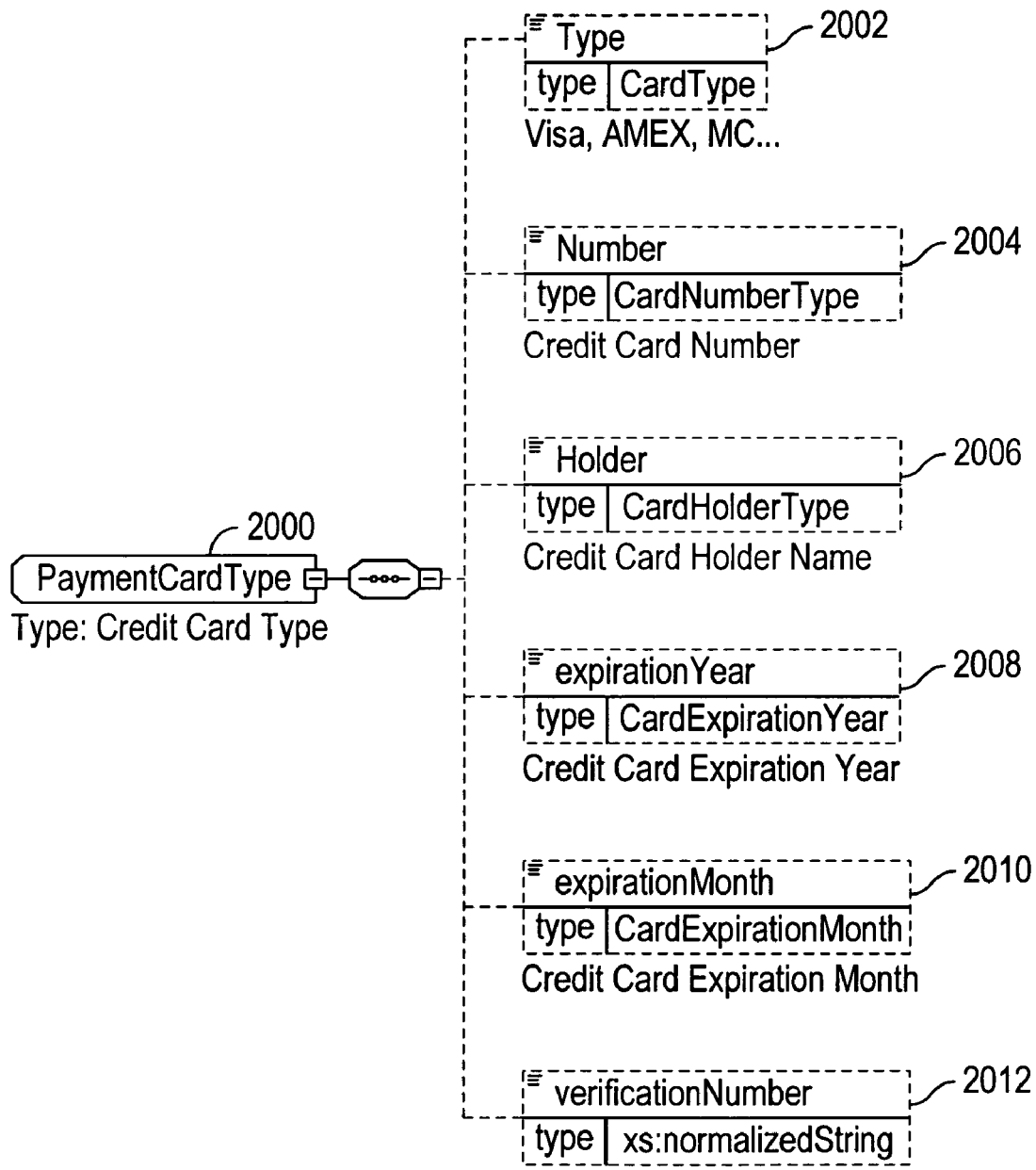
FIG. 20 shows the payment card type structure 2000.

FIG. 20 shows that the payment card type structure 2000 may include one or more of: a payment card type element 2002, a payment card number element 2004, a payment card holder element 2006, a payment card expiration year element 2008, a payment card expiration month element 2010, and a payment card verification number element 2012.

Figure 21:
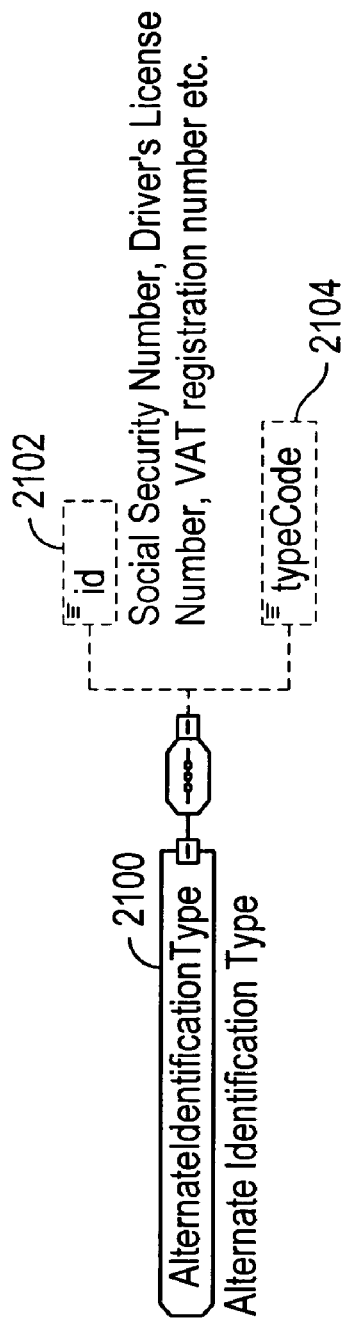
FIG. 21 shows the alternate identification type structure 2100.

FIG. 21 shows that the alternate identification type structure 2100 may include one or more of: an ID element 2102, and an ID type element 2104.

Figure 22:
FIG. 22 shows the data cleansing data type structure 2200.

FIG. 22 shows that the data cleansing data type structure 2200 may include a disable cleansing flag element 2202.

It will be appreciated by those skilled in the art that the above-described facility may be straightforwardly adapted or extended in various ways. For example, the facility may be used to transform various other kinds of enterprise information, and may be used to transform enterprise information between a variety of other formats.

In the foregoing specification, embodiments of the invention have been described with reference to numerous specific details that may vary from implementation to implementation. Thus, the sole and exclusive indicator of what the invention is and what is intended by the applicants to be the invention, is the set of claims that issue from this application, in the specific form in which such claims issue, including any subsequent correction. Any express definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

We claim:

1. A computer-implemented method comprising:
    managing enterprise data, wherein said managing enterprise data comprises
    receiving first data in a first format from a first source system;
    receiving second data in a second format from a second source system, wherein the second format is distinct from the first format;
    storing the first data and the second data in an intermediate format, wherein
        the intermediate format is defined by a plurality of common objects that pass data from the first and second source systems to a target system,
        the intermediate format comprises a schema defining a plurality of common data type elements accessible by each of the plurality of common objects, wherein one or more of the common data type elements are reusable data structures and referenced by other intermediate data structures,
        a data element defined by one of the common data type elements having a consistent structure in each common object using that data element,
        one or more of the common data type elements are reusable data structures that are referenced by other intermediate data structures, and
        said storing comprises mapping the first data and the second data to the intermediate format using one or more of the common data type elements; and
    providing the mapped first data and second data to the target system in a target format.

2. The method of claim 1, wherein the common data type elements comprise one or more elements comprising:
    an application element;
    a fault handler input element;
    a fault handler output element;
    a fault transformer input element;
    a fault transformer output element;
    a list of application instance element;
    a list of application type element;
    a list of ID cross-reference element;
    a list of ID cross-reference data element;
    a list of message definition element;
    a list of message text element;
    a list of value cross-reference element;
    a list of value cross-reference data element;
    a message element; a message set element;
    an activity type element; an address type element;
    an alternate ID type element;
    a communication data type element; and
    a data cleansing data type element.

3. The method of claim 2, wherein the application element comprises one or more elements comprising:
    an application instance name element;
    an application type name element; and
    an application instance description element.

4. The method of claim 2, wherein the fault handler input element comprises one or more elements or sub-elements comprising:
    an error type element;
    an error language element;
    an error severity element;
    an error flow name element;
    an error flow context element;
    a process name element;
    a message set element;
    a plurality of message text sub-elements; and
    a plurality of child message set sub-elements.

5. The method of claim 2, wherein the fault handler output element comprises a message text element.

6. The method of claim 2, wherein the fault transformer input element comprises one or more elements or sub-elements comprising:
    an error type element;
    an error language element;
    an error severity element;
    an error flow name element;
    an error flow context element;
    a process name element;
    a message set element;
    a plurality of message text sub-elements; and
    a plurality of child message set sub-elements.

7. The method of claim 2, wherein the fault transformer output element comprises a message text element.

8. The method of claim 2, wherein the list of application instance element comprises one or more elements or sub-elements comprising:
    a plurality of application instance definition elements;
    an application instance name sub-element;
    an application type name sub-element;
    an application instance description sub-element;
    a list of one-to-many ID cross-reference sub-element;
    a plurality of ID cross-reference sub-elements;
    an ID cross-reference name sub-element; and
    an ID cross-reference description sub-element.

9. The method of claim 2, wherein the list of application type element comprises one or more elements or sub-elements comprising:
    a plurality of application type elements;
    an application type name sub-element; and
    an application type description sub-element.

10. The method of claim 2, wherein the list of ID cross-reference element comprises one or more elements or sub-elements comprising:
    a plurality of ID cross-reference elements;
    an ID cross-reference name sub-element; and
    an ID cross-reference description sub-element.

11. The method of claim 2, wherein the list of ID cross-reference data element comprises one or more elements or sub-elements comprising:
    a plurality of ID cross-reference elements;
    a plurality application instance sub-elements; and
    a plurality application ID sub-elements.

12. The method of claim 2, wherein the list of message definition element comprises one or more elements or sub-elements comprising:
- a plurality of message definition elements;
- a message code sub-element;
- a message description sub-element;
- a message corrective action sub-element; and
- a message argument name sub-element.

13. The method of claim 2, wherein the list of message text element comprises a plurality of message text elements.

14. The method of claim 2, wherein the list of value cross-reference element comprises one or more elements or sub-elements comprising:
- a plurality of value cross-reference elements;
- a value cross-reference name sub-element; and
- a value cross-reference description sub-element.

15. The method of claim 2, wherein the list of value cross-reference data element comprises one or more elements or sub-elements comprising:
- a plurality of value cross-reference elements;
- a plurality application type sub-elements; and
- a plurality application value sub-elements.

16. The method of claim 2, wherein the message set element comprises one or more elements or sub-elements comprising:
- a plurality of message text elements; and
- a plurality of child message set elements.

17. The method of claim 2, wherein the activity type element comprises one or more elements or sub-elements comprising:
- an activity published code element;
- an activity comment element;
- an activity duration element;
- an activity end date element;
- an activity number element;
- an activity reason code element;
- an activity start date element;
- an activity task description element;
- an activity type code element;
- an activity planned duration sub-element;
- an activity actual duration sub-element;
- an activity actual date sub-element;
- an activity actual time sub-element;
- an activity planned date sub-element; and
- an activity planned time sub-element.

18. The method of claim 2, wherein the address type element comprises one or more elements or sub-elements comprising:
- a plurality of address line elements;
- an address city element;
- an address state code element;
- an address county element;
- an address province element;
- an address country code element;
- an address house number element;
- an address house prefix element;
- an address house suffix element;
- an address postal code element;
- an address street direction element;
- an address street name element;
- an address street number element;
- an address street prefix number element;
- an address street prefix type element;
- an address street suffix element;
- an address thoroughfare element;
- an address list of location designator element;
- a plurality of address location designator sub-elements;
- an address location designator name sub-element; and
- an address location designator value sub-element.

19. The method of claim 2, wherein the alternate ID type element comprises one or more elements comprising: an ID element; and an ID type element.

20. The method of claim 2, wherein the communication data type element comprises one or more elements or sub-elements comprising:
- a list of phone number element;
- a list of email element;
- a list of web page element;
- a custom communication data element;
- a phone number sub-element;
- an email sub-element;
- a web page sub-element;
- a phone number area code sub-element;
- a phone number country code sub-element;
- a phone number extension sub-element;
- a phone number international access code sub-element;
- a phone number type code sub-element;
- an email type sub-element;
- an email address sub-element;
- a web page type sub-element; and
- a web page address sub-element.

21. The method of claim 2, wherein the data cleansing type element comprises a disable cleansing flag element.

22. A computer-readable storage medium having one or more sequences of instructions, said one or more sequences of instructions, when executed by a computer, cause a processor to perform the steps:
- managing enterprise data, wherein said managing enterprise data comprises:
  - receiving first data in a first format from a first source system,
  - receiving second data in a second format from a second source system, wherein the second format is distinct from the first format,
  - storing the first data and the second data in an intermediate format, wherein
    - the intermediate format is defined by a plurality of common objects that pass data from the first and second source systems to a target system,
    - the intermediate format comprises a schema defining a plurality of common data type elements accessible by each of the plurality of common objects, wherein one or more of the common data type elements are reusable data structures and referenced by other intermediate data structures,
  - a data element defined by one of the common data type elements has a consistent structure in each common object using that data element,
  - one or more of the common data type elements are reusable data structures that are referenced by other intermediate data structures, and
  - said storing comprises mapping the first data and the second data to the intermediate format using one or more of the common data type elements; and
  - providing the mapped first data and second data to the target system in a target format.

23. The computer-readable storage medium of claim 22, wherein the common data type elements comprise one or more elements comprising:
- an application element;
- a fault handler input element;
- a fault handler output element;
- a fault transformer input element;
- a fault transformer output element;

a list of application instance element;
a list of application type element;
a list of ID cross-reference element;
a list of ID cross-reference data element;
a list of message definition element;
a list of message text element;
a list of value cross-reference element;
a list of value cross-reference data element;
a message element;
a message set element;
an activity type element;
an address type element;
an alternate ID type element;
a communication data type element; and
a data cleansing data type element.

24. The computer-readable storage medium of claim 23, wherein the application element comprises one or more elements comprising:
an application instance name element;
an application type name element; and
an application instance description element.

25. The computer-readable storage medium of claim 23, wherein the fault handler input element comprises one or more elements or sub-elements comprising:
an error type element;
an error language element;
an error severity element;
an error flow name element;
an error flow context element;
a process name element;
a message set element;
a plurality of message text sub-elements; and
a plurality of child message set sub-elements.

26. The computer-readable storage medium of claim 23, wherein the fault handler output element comprises a message text element.

27. The computer-readable storage medium of claim 23, wherein the fault transformer input element comprises one or more elements or sub-elements comprising:
an error type element;
an error language element;
an error severity element;
an error flow name element;
an error flow context element;
a process name element;
a message set element;
a plurality of message text sub-elements; and
a plurality of child message set sub-elements.

28. The computer-readable storage medium of claim 23, wherein the fault transformer output element comprises a message text element.

29. The computer-readable storage medium of claim 23, wherein the list of application instance element comprises one or more elements or sub-elements comprising:
a plurality of application instance definition elements;
an application instance name sub-element;
an application type name sub-element;
an application instance description sub-element;
a list of one-to-many ID cross-reference sub-element;
a plurality of ID cross-reference sub-elements;
an ID cross-reference name sub-element; and
an ID cross-reference description sub-element.

30. The computer-readable storage medium of claim 23, wherein the list of application type element comprises one or more elements or sub-elements comprising:
a plurality of application type elements;
an application type name sub-element; and
an application type description sub-element.

31. The computer-readable storage medium of claim 23, wherein the list of ID cross-reference element comprises one or more elements or sub-elements comprising:
a plurality of ID cross-reference elements;
an ID cross-reference name sub-element; and
an ID cross-reference description sub-element.

32. The computer-readable storage medium of claim 23, wherein the list of ID cross-reference data element comprises one or more elements or sub-elements comprising:
a plurality of ID cross-reference elements;
a plurality application instance sub-elements; and
a plurality application ID sub-elements.

33. The computer-readable storage medium of claim 23, wherein the list of message definition element comprises one or more elements or sub-elements comprising:
a plurality of message definition elements;
a message code sub-element;
a message description sub-element;
a message corrective action sub-element; and
a message argument name sub-element.

34. The computer-readable storage medium of claim 23, wherein the list of message text element comprises a plurality of message text elements.

35. The computer-readable storage medium of claim 23, wherein the list of value cross-reference element comprises one or more elements or sub-elements comprising:
a plurality of value cross-reference elements;
a value cross-reference name sub-element; and a value cross-reference description sub-element.

36. The computer-readable storage medium of claim 23, wherein the list of value cross-reference data element comprises one or more elements or sub-elements comprising:
a plurality of value cross-reference elements;
a plurality application type sub-elements; and
a plurality application value sub-elements.

37. The computer-readable storage medium of claim 23, wherein the message set element comprises one or more elements or sub-elements comprising: a plurality of message text elements; and a plurality of child message set elements.

38. The computer-readable storage medium of claim 23, wherein the activity type element comprises one or more elements or sub-elements comprising:
an activity published code element;
an activity comment element;
an activity duration element;
an activity end date element;
an activity number element;
an activity reason code element;
an activity start date element;
an activity task description element;
an activity type code element;
an activity planned duration sub-element; an activity actual duration sub-element;
an activity actual date sub-element;
an activity actual time sub-element;
an activity planned date sub-element; and
an activity planned time sub-element.

39. The computer-readable storage medium of claim 23, wherein the address type element comprises one or more elements or sub-elements comprising:
a plurality of address line elements;
an address city element;
an address state code element;
an address county element;
an address province element;
an address country code element;

an address house number element;
an address house prefix element;
an address house suffix element;
an address postal code element;
an address street direction element;
an address street name element;
an address street number element;
an address street prefix number element;
an address street prefix type element;
an address street suffix element;
an address thoroughfare element;
an address list of location designator element;
a plurality of address location designator sub-elements;
an address location designator name sub-element; and
an address location designator value sub-element.

40. The computer-readable storage medium of claim 23, wherein the alternate ID type element comprises one or more elements comprising: an ID element; and an ID type element.

41. The computer-readable storage medium of claim 23, wherein the communication data type element comprises one or more elements or sub-elements comprising:

a list of phone number element;
a list of email element;
a list of web page element;
a custom communication data element;
a phone number sub-element;
an email sub-element;
a web page sub-element;
a phone number area code sub-element;
a phone number country code sub-element;
a phone number extension sub-element;
a phone number international access code sub-element;
a phone number type code sub-element;
an email type sub-element;
an email address sub-element;
a web page type sub-element; and
a web page address sub-element.

42. The computer-readable storage medium of claim 23, wherein the data cleansing type element comprises a disable cleansing flag element.

* * * * *

UNITED STATES PATENT AND TRADEMARK OFFICE
CERTIFICATE OF CORRECTION

PATENT NO. : 7,711,680 B2  
APPLICATION NO. : 10/809943  
DATED : May 4, 2010  
INVENTOR(S) : Barnes-Leon et al.

Page 1 of 1

It is certified that error appears in the above-identified patent and that said Letters Patent is hereby corrected as shown below:

On sheet 9 of 15, in Figure 14, Box 1300, line 3, delete "List of of" and insert -- List of --, therefor.

Signed and Sealed this
Twelfth Day of July, 2011

David J. Kappos
*Director of the United States Patent and Trademark Office*